United States Patent
Gupta et al.

(10) Patent No.: US 11,412,056 B2
(45) Date of Patent: Aug. 9, 2022

(54) TECHNIQUES FOR PROXYING NETWORK REQUESTS USING SERVICE WORKERS

(71) Applicant: NETFLIX, INC., Los Gatos, CA (US)

(72) Inventors: Akanksha Gupta, Redwood City, CA (US); Timothy A. Branyen, San Francisco, CA (US); Olivier Poitrey, Le Chesnay (FR)

(73) Assignee: NETFLIX, INC., Los Gatos, CA (US)

( * ) Notice: Subject to any disclaimer, the term of this patent is extended or adjusted under 35 U.S.C. 154(b) by 11 days.

(21) Appl. No.: 17/010,783

(22) Filed: Sep. 2, 2020

(65) Prior Publication Data

US 2021/0067600 A1 Mar. 4, 2021

Related U.S. Application Data

(60) Provisional application No. 62/895,473, filed on Sep. 3, 2019.

(51) Int. Cl.
| | |
|---|---|
| *H04L 67/564* | (2022.01) |
| *H04L 67/5681* | (2022.01) |
| *H04L 9/40* | (2022.01) |
| *G06F 9/54* | (2006.01) |
| *G06F 16/955* | (2019.01) |
| *H04L 67/02* | (2022.01) |

(52) U.S. Cl.
CPC .......... *H04L 67/2819* (2013.01); *G06F 9/547* (2013.01); *G06F 16/955* (2019.01); *H04L 63/0823* (2013.01); *H04L 67/02* (2013.01); *H04L 67/2847* (2013.01)

(58) Field of Classification Search
CPC . H04L 67/2819; H04L 63/0823; H04L 67/02; H04L 67/2847; G06F 16/955; G06F 9/547
See application file for complete search history.

(56) References Cited

U.S. PATENT DOCUMENTS

| | | | |
|---|---|---|---|
| 9,639,629 B1 * | 5/2017 | Venkat | G06F 16/9574 |
| 10,601,948 B1 * | 3/2020 | Juravicius | H04L 63/0272 |

(Continued)

FOREIGN PATENT DOCUMENTS

EP  2 874 078 A1  5/2015

OTHER PUBLICATIONS

Partial Search Report for application No. PCT/US2020/049263 dated Nov. 9, 2020.

(Continued)

*Primary Examiner* — Benjamin M Thieu
(74) *Attorney, Agent, or Firm* — Artegis Law Group, LLP

(57) ABSTRACT

In various embodiments, a service worker processes network requests by proxying the network requests via a content distribution network. The service worker intercepts a network request from a client application, generates a duplicate network request, and changes certain elements of the duplicate network request. The intercepted request can be an initial document request used to load a webpage or a subsequent request that includes an application programming interface (API) call. The service worker transmits the duplicate network request to a content distribution network that proxies the duplicate request to a cloud computing system, thereby accelerating that request.

19 Claims, 5 Drawing Sheets

(56) References Cited

U.S. PATENT DOCUMENTS

| | | | | |
|---|---|---|---|---|
| 2010/0205665 A1* | 8/2010 | Komili | ............... | H04L 67/2819 |
| | | | | 726/12 |
| 2015/0120861 A1* | 4/2015 | Huang | ................. | G06F 16/957 |
| | | | | 709/213 |
| 2016/0380975 A1* | 12/2016 | Reddy | ................ | H04L 61/1511 |
| | | | | 726/12 |
| 2017/0371888 A1* | 12/2017 | Zong | .................... | G06F 16/958 |

OTHER PUBLICATIONS

Webpwnized: "Introduction to Web Request and Response Interception with Burp-Suite", XP054981042, Jan. 14, 2012, Retrieved from the Internet: URL:https://www.youtube.com/watch?v=qsE04AhlJrc, Youtube, retrieved on Dec. 29, 2020, 1 page.

Wikipedia, Anonymous: "Proxy server—Wikipedia", XP55745129, Retrieved from the Internet: URL:https://en.wikipedia.org/w/index.php?title = Proxy server&old i d=913512943, retrieved on Dec. 29, 2020, Sep. 1, 2019, 14 pages.

Ramirez, Nick, "Enabling CORS in HAProxy—HAProxy Technologies", XP055745168, Retrieved from the Internet: URL:https://www.haproxy.com/blog/enablingcors-in-haproxy/, retrieved on Dec. 29, 2020, Aug. 30, 2019, 9 pages.

International Search Report for application No. PCT/US2020/049263 dated Jan. 20, 2021.

* cited by examiner

TECHNIQUES FOR PROXYING NETWORK REQUESTS USING SERVICE WORKERS

CROSS-REFERENCE TO RELATED APPLICATIONS

This application claims the benefit of United States provisional patent application titled, "Web FTL Integration with Service Workers," filed on Sep. 3, 2019 and having Ser. No. 62/895,473. The subject matter of this related application is hereby incorporated herein by reference.

BACKGROUND

Field of the Invention

Embodiments of the present disclosure relate generally to computer networking and, more specifically, to techniques for proxying network requests.

Description of the Related Art

Cloud computing systems, which typically include clusters of server machines and related networking infrastructure, are designed to provide on-demand computing resources to customers and other users. Web services, such as streaming video services, are oftentimes hosted on cloud computing systems.

For content, such as streaming video and related content, that is stored on a cloud computing system, a content distribution network (CDN) can be implemented to accelerate the delivery of that content to customers and other users. A CDN generally includes a geographically distributed group of server machines (e.g., thousands of servers). In some implementations, the server machines within a CDN proxy requests for dynamic content to a cloud computing system. An example of a request for dynamic content is an application programming interface (API) request to update a portion of a webpage in response to user interaction with the webpage (e.g., user search input or hovering over a webpage element). A client application can transmit such a request for dynamic content to a server machine of the CDN that is located closer to the client application than the cloud computing system. The server machine then forwards the request to the cloud computing system via a network backbone that provides a more direct and secure connection to the cloud computing system than the public Internet. When the server machine receives a response to the request from the cloud computing system via the same network backbone, the server machine forwards the response back to the client application. Accordingly, the server machine accelerates the request for dynamic content that would otherwise have to traverse the public Internet.

Conventionally, a webpage can include logic (e.g., JavaScript code) that transmits dynamic requests associated with user interactions to a CDN that proxies those requests to a cloud computing system. However, such logic in a webpage can only execute after the webpage has been loaded on a web browser. An initial request to load the webpage on the web browser cannot be proxied, or otherwise accelerated, via a CDN using logic in a webpage.

Alternatively, a conventional CDN can take over the domain of a website to accelerate webpage(s) of the website. However, if the domain is taken over by a CDN and no longer associated with a cloud computing system, then requests cannot be made directly to the cloud computing system if the CDN experiences issues. In addition, security certificates for sensitive hostnames would need to be hosted on the CDN, which may be less secure than hosting those security certificates on the cloud computing system.

As the foregoing illustrates, what is needed in the art are more effective techniques for loading webpages on web browsers without requiring the domain of a website to be taken over by a CDN.

SUMMARY OF THE EMBODIMENTS

One embodiment of the present disclosure sets forth a computer-implemented method for processing a network request. The method includes intercepting a first network request transmitted by a web application. The method further includes generating a second network request based on the first network request. In addition, the method includes transmitting the second network request to a content distribution network for processing.

Another embodiment of the present disclosure sets forth one or more computer-readable storage media including instructions that, when executed by one or more processors, cause the one or more processors to process a network request by performing the steps of: intercepting a first network request transmitted by a web application; generating a second network request based on the first network request; and transmitting the second network request to a content distribution network for processing.

Another embodiment of the present disclosure sets forth a system including one or more memories that include instructions, and one or more processors that are coupled to the one or more memories and, when executing the instructions are configured to: intercept a first network request transmitted by a web application, generate a second network request based on the first network request, and transmit the second network request to a content distribution network for processing.

At least one technical advantage of the disclosed techniques relative to the prior art is an initial request to load a webpage on a web browser can be accelerated via a content distribution network that is in communication with a cloud computing system. When a request to the content distribution network encounters an error, the request can be re-transmitted directly to the cloud computing system as a fallback route that improves resiliency. In addition, the content distribution network does not need to host security certificates for sensitive hostnames. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
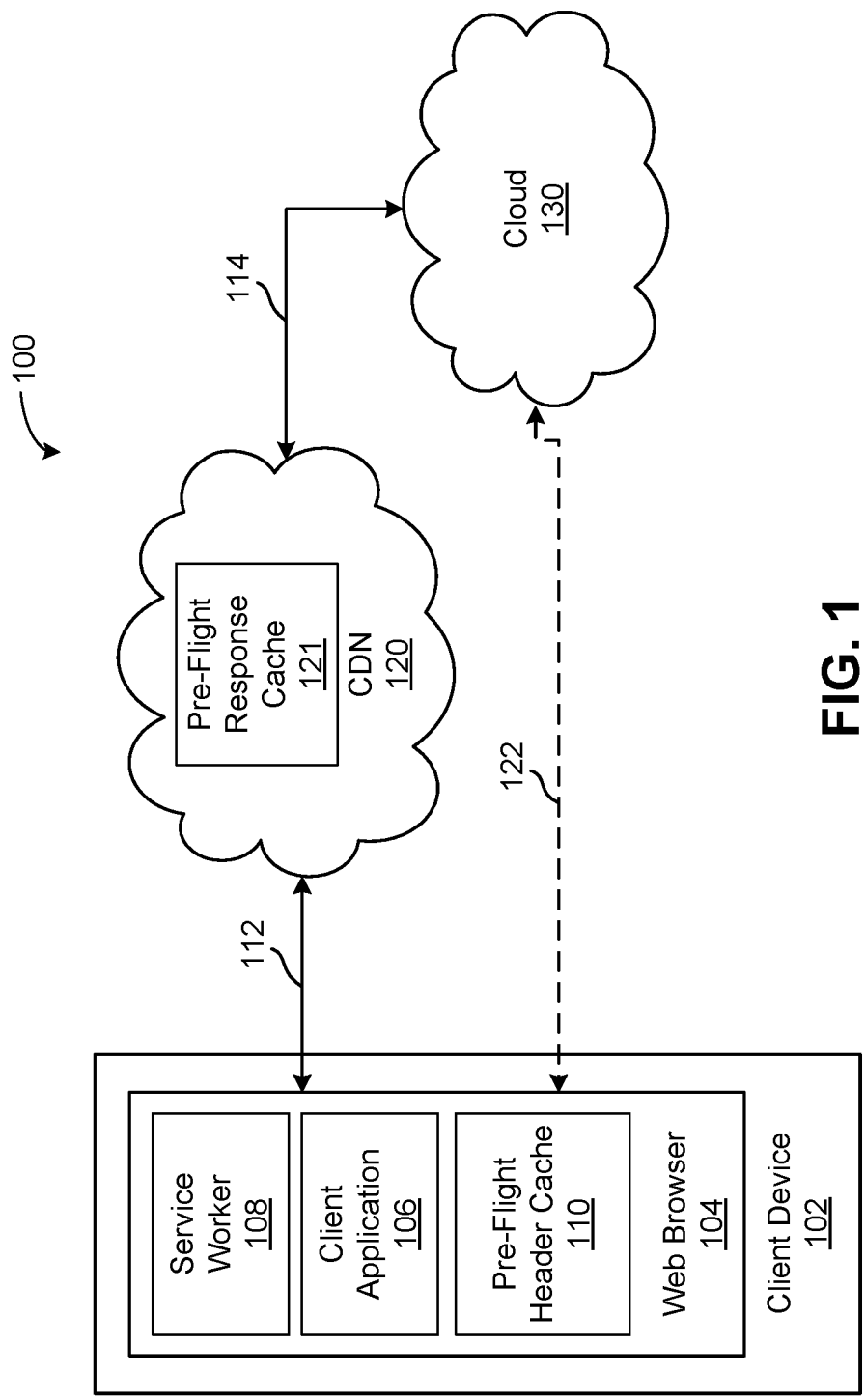
FIG. 1 is a conceptual illustration of a system that is configured to implement one or more aspects of the various embodiments.

In the following description, numerous specific details are set forth to provide a more thorough understanding of the present disclosure. However, it will be apparent to one skilled in the art that the present disclosure may be practiced without one or more of these specific details.

Conventional content distribution networks (CDN) can be used to proxy dynamic requests associated with user interactions with a webpage to a cloud computing system, after the webpage is loaded on a web browser. However, an initial request to load the webpage on the web browser cannot be proxied, or otherwise accelerated, via a CDN using logic in a webpage. Alternatively, a conventional CDN can take over the domain of a website to accelerate webpage(s) of the website. However, if the domain is taken over by the CDN and no longer associated with the cloud computing system, then requests cannot be made directly to the cloud computing system if the CDN experiences issues. In addition, security certificates for sensitive hostnames would need to be hosted on the CDN, which may be less secure than hosting those security certificates on the cloud computing system.

In the disclosed techniques, a service worker processes network requests by proxying the network requests via a CDN. The service worker is a JavaScript program that is loaded by a web browser in a dedicated thread to handle logic that does not require a website to be open in a webpage. A client application first registers a service worker with a web browser, after which the web browser executes the service worker when webpages associated with the client application are being subsequently loaded. In some embodiments, the service worker intercepts a network request from the client application, generates a duplicate network request, and changes certain elements of the duplicate network request. The intercepted request can be an initial document request used to load a webpage or a subsequent request that includes an application programming interface (API) call (also referred to herein as an API request). The service worker transmits the duplicate of the intercepted requests to a CDN that proxies the duplicate request to a cloud computing system, thereby accelerating that request. If the service worker detects an error indicating that the proxy path is not accessible, the service worker sends the network request directly to the cloud computing system (after retrying the proxy path in some cases). In particular, CDN acceleration can be enabled on webpage load and subsequent dynamic requests only when there is an ability to fallback to the cloud computing system when the CDN experiences an issue.

Advantageously, the disclosed techniques permit an initial request to load a webpage on a web browser to be accelerated via a content distribution network that is in communication with a cloud computing system. When a request to the content distribution network encounters an error, the request can be re-transmitted directly to the cloud computing system as a fallback route that improves resiliency. In addition, the content distribution network does not need to host security certificates for sensitive hostnames.

System Overview

FIG. 1 is a conceptual illustration of a system 100 that is configured to implement one or more aspects of the various embodiments. As shown, the system 100 includes a client device 102, a CDN 120, and a cloud computing system 130.

The cloud computing system 130 may include one or more data centers, each of which may include, without limitation, any number and type of compute instances. Each such compute instance may include, without limitation, a processor such as a central processing unit (CPU), a graphics processing unit (GPU), a controller, a microcontroller, a state machine, or any combination thereof that is capable of executing instructions and a memory that stores content used by the processor, such as a random access memory (RAM), read only memory (ROM), flash drive, hard disk, and/or any other form of digital storage, local or remote. Examples of cloud computing systems include Amazon Web Services (AWS®), Microsoft Azure® Cloud, and Google Cloud Platform®. In general, compute instances included in the cloud computing system 130 are configured to implement one or more applications and/or subsystems of applications. For example, applications could execute in the cloud regions 212 to host one or more webpages that provide a video streaming service.

The CDN 120 may include one or more server machines, such as a geographically distributed group of server machines (e.g., thousands of servers). The server machines of a CDN can be used to (1) accelerate the delivery of static content by caching static content (e.g., images, videos) on edge servers of the CDN that communicate with clients, and/or (2) accelerate the delivery of dynamic content by proxying requests for dynamic content to the cloud computing system 130. As described, an example of a dynamic request is an API request to update a portion of a webpage in response to user interaction with the webpage, such as a user search input or hovering over an element of the webpage. Although described herein primarily with respect to API requests as a reference example, some embodiments may handle other types of dynamic requests in addition to, or in lieu of, API requests.

The client device 102, which is described in greater detail below in conjunction with FIG. 2, may be any computing device capable of running a web browser 104 that communicates with the cloud computing system 130 to retrieve static and/or dynamic content associated with one or more webpages. As shown, the web browser 104 can communicate directly with the cloud computing system 130 via a path 122 over the Internet. Alternatively, the web browser 104 can transmit requests to the CDN 120, which as described above caches static content and/or proxies requests for dynamic content to the cloud computing system 130, thereby accelerating the delivery of static and/or dynamic content.

As shown, the web browser 104 executes a client application 106 as well as a service worker 108. As described, the service worker 108 is a JavaScript program that is loaded by a web browser in a dedicated thread to handle logic that does not require a website to be open in a webpage. Typically, a single service worker can be loaded by a web browser for all of the webpages of a managed website domain. For example, if several tabs of the web browser are opened to webpages of a particular domain, the web browser 104 could execute only one instance of an associated service worker to handle network requests for those tabs. The client application 106 is a web application that registers the service worker 108 with the web browser 104 when a webpage of the client application is first loaded. In particular, the service worker 108 is registered to control a particular domain and to execute on page load. The registered service worker 108 can then be downloaded as a file from a server machine that is on the same domain and installed. Thereafter, the web browser executes the service worker 108 when webpages of the domain are subsequently loaded. It should be understood that different web browsers can implement different techniques for installing and executing service workers. In addition, service workers can be unregistered and updated differently by different web browsers.

When executed, the service worker 108 is a distinct process that intercepts network requests associated with the domain of the client application 106 and proxies some or all of those requests via the CDN 120, as described in greater detail below in conjunction with FIGS. 4-5. As shown, the web browser 104 also includes a cache 110 (e.g., a database) in which pre-flight header(s) are stored, and the CDN 120 also includes a cache 121 in which pre-flight response(s) are stored. As described in greater detail below in conjunction with FIG. 5, the web browser 104 will generally not permit a request that is intended for the cloud computing system 130 to instead be sent to the CDN 120. In order to enable requests to be sent to the CDN 120 instead of the cloud computing system 130, the service 108 needs to make a pre-flight request, called an OPTIONS request, to request permission from the cloud computing system 130 to send the requests to the CDN 120. However, making such a pre-flight request to the cloud computing system 130 prior to sending every request to the CDN 120 is inefficient. To avoid such pre-flight requests to the cloud computing system 130, a response to the pre-flight request is stored in the cache 121 of the CDN 120. Pre-flight requests can then be sent to the CDN 120 rather than the 130, which is faster. A pre-flight header that is generated in response to the pre-flight response can also be stored in the cache 110 of the browser 104, and added to subsequent requests, to avoid making additional pre-flight requests (to the CDN 120 or the cloud computing system 130). In addition, the service worker 108 can add the pre-flight header to a duplicate of the request that is to be proxied via the CDN 120, set a mode of the duplicate request to cross-origin resource sharing (CORS) so that the hostname in the request 300 can be changed to a different hostname associated with one of the server machines of the CDN 120, set a credentials field to true so that cookies are also sent, set a body of the duplicate request to point to a body of the original request that was read and temporarily stored in a buffer as a blob or array buffer object, and add an origin header for initial document requests to indicate when those initial document requests were proxied via the CDN 120 and subsequent dynamic requests should also be proxied via the CDN 120, as described in greater detail below in conjunction with FIG. 5.

Although described herein primarily with respect to service workers, techniques disclosed herein can be performed by any technically feasible software, such as middleman processes or web browser extensions.

For explanatory purposes only, one cloud computing system 130, one CDN 120, one client device 102, and one web browser 104 are shown in FIG. 1. However, as persons skilled in the art will recognize, the system 100 may generally include any number of cloud computing systems, CDNs, client devices, and web browsers. Further, functionality of software running in the cloud computing systems, CDNs, and client devices may be distributed across any number of other computing devices, and functionality of any number of applications may be consolidated into a single application or subsystem.

Figure 2:
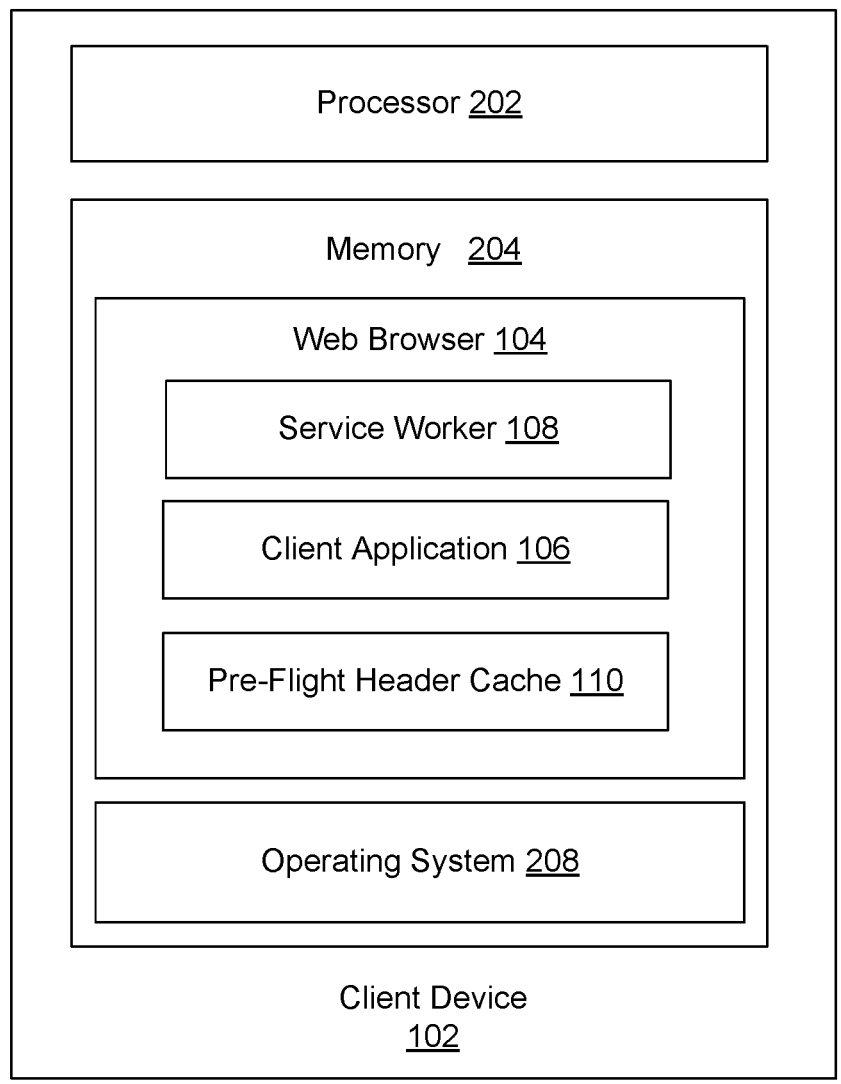
FIG. 2 is a more detailed illustration of the client device of FIG. 1, according to various embodiments.

FIG. 2 is a more detailed illustration of the client device 102 of FIG. 1, according to various embodiments. As shown, the client device 102 includes, without limitation, a processor 202 and a memory 204. The processor 202 may be any instruction execution system, apparatus, or device capable of executing instructions. For example, the processor 202 could comprise a CPU, a GPU, a controller, a microcontroller, a state machine, or any combination thereof. The memory 204 stores content, such as software applications and data, for use by the processor 202.

The memory 204 may be one or more of a readily available memory, such as random access memory (RAM), read only memory (ROM), floppy disk, hard disk, or any other form of digital storage, local or remote. In some embodiments, a storage (not shown) may supplement or replace the memory 204. The storage may include any number and type of external memories that are accessible to the processor 202. For example, and without limitation, the storage may include a Secure Digital Card, an external Flash memory, a portable compact disc read-only memory (CD-ROM), an optical storage device, a magnetic storage device, or any suitable combination of the foregoing.

As shown, the system memory 204 stores a web browser 104 and an operating system 308. The operating system 308 may be, e.g., Linux®, Microsoft Windows®, or Android™. The web browser 104 is a software application for accessing information on the Internet. Examples of web browsers include Google Chrome®, Safari®, and Microsoft Edge®. Illustratively, the web browser 104 executes the service worker 108. As described, the service worker 108 can be registered by a webpage and thereafter executes to intercept and handle network requests associated with a domain of the webpage. In some embodiments, the service worker 108 handles both initial document requests to load a webpage as well as dynamic content requests associated with the domain by proxying the requests via the CDN 120, as described in greater detail below in conjunction with FIGS. 3-5.

Proxying Network Requests Using Service Workers

Figure 3:
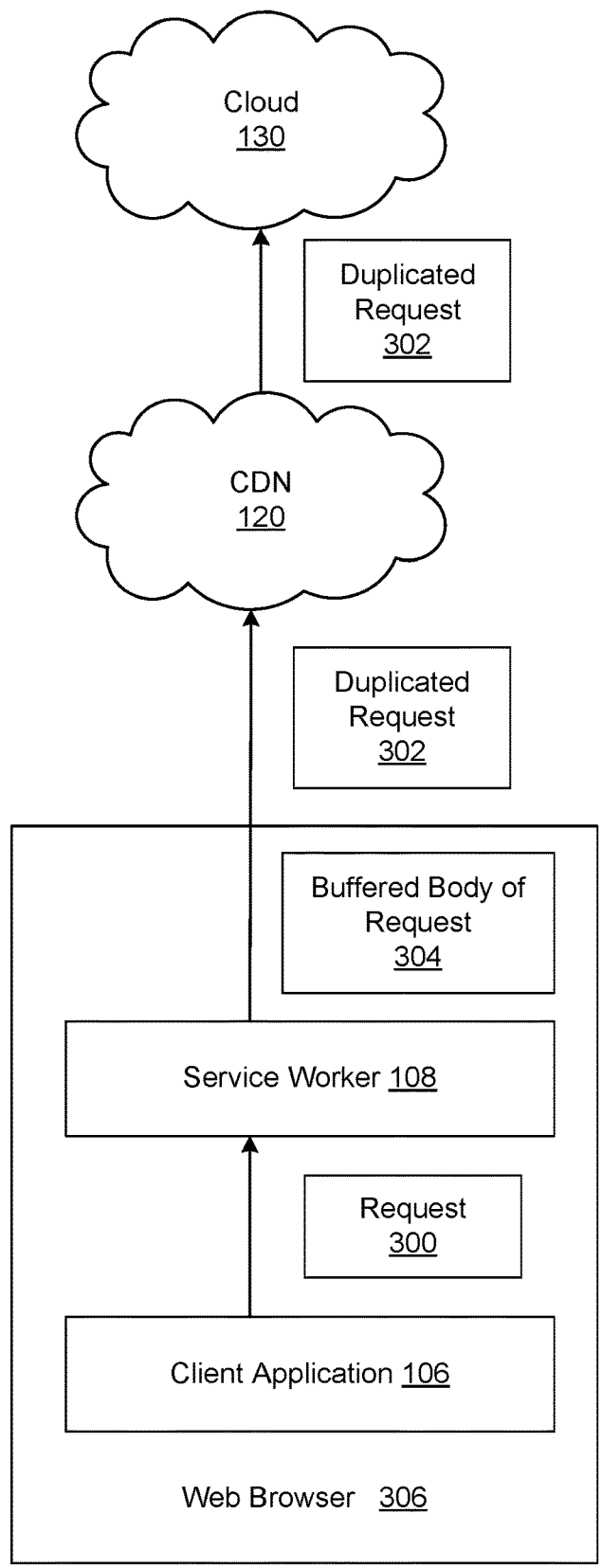
FIG. 3 illustrates an approach for intercepting and handling network requests using a service worker, according to various embodiments.

FIG. 3 illustrates an approach for intercepting and handling network requests using the service worker 108, according to various embodiments. As shown, the service worker 108 intercepts a request 300 associated with a webpage included in the webpage(s) of a domain the service worker 108 was registered to control. In particular, the service worker 108 receives fetch events from the web browser 104 whenever the client application 106 issues requests associated with webpage(s) controlled by the service worker 108. The service worker 108 handles the fetch events and responds back to the web browser 104 through the respondWith( ) method on those events. Accordingly, the service 108 is able to control network requests and responses associated with the domain and associated webpage(s) that the service worker 108 was registered to control.

In some embodiments, the service worker 108 handles fetch events by attempting to proxy some or all of the requests associated with those fetch events via the CDN 120. The service worker 108 can be configured to proxy certain types of requests, but not others, via the CDN 120. In some embodiments, the service worker 108 proxies initial document requests used to load webpages and dynamic content requests when a user interacts with those webpages. In such cases, the initial document request can be used to request a markup, such as the Hypertext Transfer Protocol (HTTP) content, that provides instructions on how the webpages look and function. The dynamic content requests can include API requests to update portion(s) of the webpages in response to, e.g., search input by the user, hovering of a cursor over a webpage element, or the like. In addition, in some embodiments, when the initial markup for a webpage is loaded via the service worker 108, the service worker 108 may modify the markup such that the web browser 104 adds a query parameter to subsequent API requests associated with the webpage, indicating that those API requests should be proxied via the CDN 120. In such cases, the service worker 108 will attempt to proxy requests having the added query parameter via the CDN 120. It should be understood that usage of the service worker 108 differs from that of conventional service workers, which are primarily used to cache content of webpages so that those webpages can be viewed when a web browser is offline.

Assuming the service worker 108 determines that the request 300 should be proxied via the CDN 120, the service worker 108 generates a duplicate of the request, shown as duplicate request 302, and send the duplicate request 302 to one of the server machine in the CDN 120 via the path 112. The server machine in the CDN 120 then proxies the duplicate request 302 to the cloud 130. Illustratively, the request is forwarded to the cloud computing system 120 via a network backbone 114 that provides a more direct and secure connection to the cloud computing system than the public Internet. When the server machine in the CDN 120 receives a response to the request from the cloud computing system via the network backbone 140, the server machine forwards the response back to the client application 106.

It should be understood that the request 300 will include various elements, such as a hostname, headers, a body, query parameters, etc. When the service worker 108 duplicates the request 300, the service worker 108 may re-create the same request, but change some elements of the request. In some embodiments, the service worker 108 can set a mode of the duplicate request to CORS so that the hostname in the request 300 can be changed to a different hostname associated with one of the server machines of the CDN 120, set a credentials field to true so that cookies are also sent, as well as add a cached pre-flight header and an origin header for initial document requests to indicate that those initial document requests were proxied via the CDN 120 and subsequent dynamic requests should also be proxied via the CDN 120, as described in greater detail below in conjunction with FIG. 5.

Some requests (e.g., POST and PUT requests) may have bodies that include stream elements that cannot be copied directly into the duplicate request 302. In some embodiments, the service worker 108 reads the body of such a request 300 and temporarily stores contents of the body in a buffer, shown as the buffered body of the request 304. For example, the buffered body of the request 304 could be a blob or array buffer object. Thereafter, the service worker sets a body of the duplicate request 302 to point to the buffered body of the request 304.

Unlike conventional service workers that cache static webpage content so that the static content can be loaded faster when the webpage is visited again, the service worker 108 permits requests for dynamic content to be accelerated by proxying such requests via the CDN 120. In addition, the service worker 108 permits initial document requests to load a webpage to be accelerated via the CDN 120, in contrast to the conventional use of CDNs to accelerate dynamic requests after a webpage has already been loaded.

In some embodiments, the service worker 108 also handles failovers when an error is encountered and a request cannot be proxied via the CDN 120 because, e.g., the service worker 108 detects that the path 112 is unreachable. In such cases, the service worker 108 may send the request 300 directly to the cloud computing system 130 via the path 122. However, if the request 300 is an initial document request, the service worker 108 first retries sending the duplicate request 302 to the CDN 120 multiple times, before sending the request 300 to the cloud computing system 130 if the service worker 108 continues encountering the error. Further, in some embodiments, CDN acceleration may be enabled on webpage load and subsequent dynamic requests only when there is an ability to fallback to the cloud computing system 130 when the CDN 120 experiences an issue.

Figure 4:
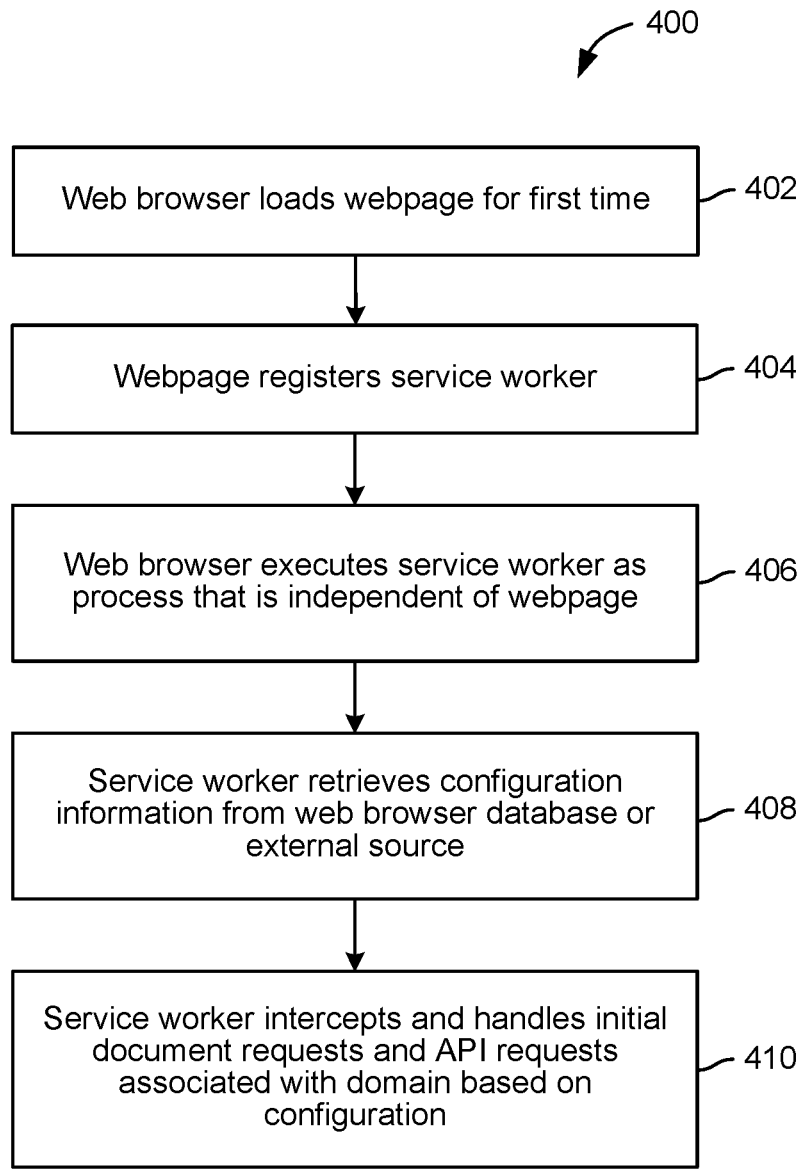
FIG. 4 is a flow diagram of method steps for registering and executing a service worker, according to various embodiments.

FIG. 4 is a flow diagram of method steps for registering and executing the service worker 108, according to various embodiments. Although the method steps are described with reference to the systems of FIGS. 1-3, persons skilled in the art will understand that any system configured to implement the method steps, in any order, falls within the scope of the present disclosure.

At step 402, the web browser 104 loads a webpage for a first time. It is assumed that the webpage includes logic (e.g., JavaScript code) for registering the service worker 108.

At step 404, the webpage registers the service worker 108. Registration of the service worker 108 causes the web browser 104 to download file(s) associated with the service worker 108 and to install the service worker 108 from those files. The service worker 108 files may be downloaded from any technically feasible location, such as a server machine associated with the domain of the webpage. As described, different web browsers can implement different techniques for registering, installing, executing, unregistering, and/or updating service workers.

At step 406, the web browser 104 executes the service worker 108 as a process that is independent of the webpage. As described, the web browser 104 executes the service worker 104 when webpages associated with the domain of the client application 106 are subsequently loaded. Because the service worker 108 is executed before initial document requests to load the webpages again are processed, the service worker 108 can proxy such initial document requests via the CDN 120. Doing so enables faster loading of the webpages on the web browser 104 relative to transmitting the initial document requests to the cloud computing system 130. In addition, because the CDN 120 does not need to take over the domain of the website, webpage loading can be accelerated using the same (non-main) domain as subsequent dynamic requests. As a result, duplicate Transmission Control Protocol (TCP)/Transport Layer Security (TLS) handshakes to two different endpoints, namely the main domain and the non-main domain, can be avoided. Further, the service worker can fallback to the main domain that is associated with the cloud computing system 130 when the CDN 120 experiences issues, as described in greater detail below.

At step 408, the service worker 108 retrieves configuration information from a database of the web browser 104, or from an external source. In some embodiments, the webpage can include logic (e.g., JavaScript) that communicates the configuration information to the service worker 108 via a messaging system (e.g., the PostMessage method), after which the configuration information is stored in a database of the web browser 104 and can subsequently be retrieved for use by the service worker 108 from that database. For example, the configuration information could indicate specific server(s) of the CDN 102 that the service worker 108 should communicate with in order to proxy network requests. In such cases, the service worker 108 can either receive the configuration information directly from the webpage, or retrieve the configuration that was previously stored in the database of the web browser 104. In other embodiments, the service worker 108 can retrieve configuration information from any technically feasible location, such as a server machine where such information is stored.

At step 410, the service worker 108 intercepts and handles initial document requests and API requests associated with a domain of the webpage based on the retrieved configuration. In some embodiments, the service worker 108 handles the initial document and API requests according to the steps described in detail below in conjunction with FIG. 5.

Figure 5:
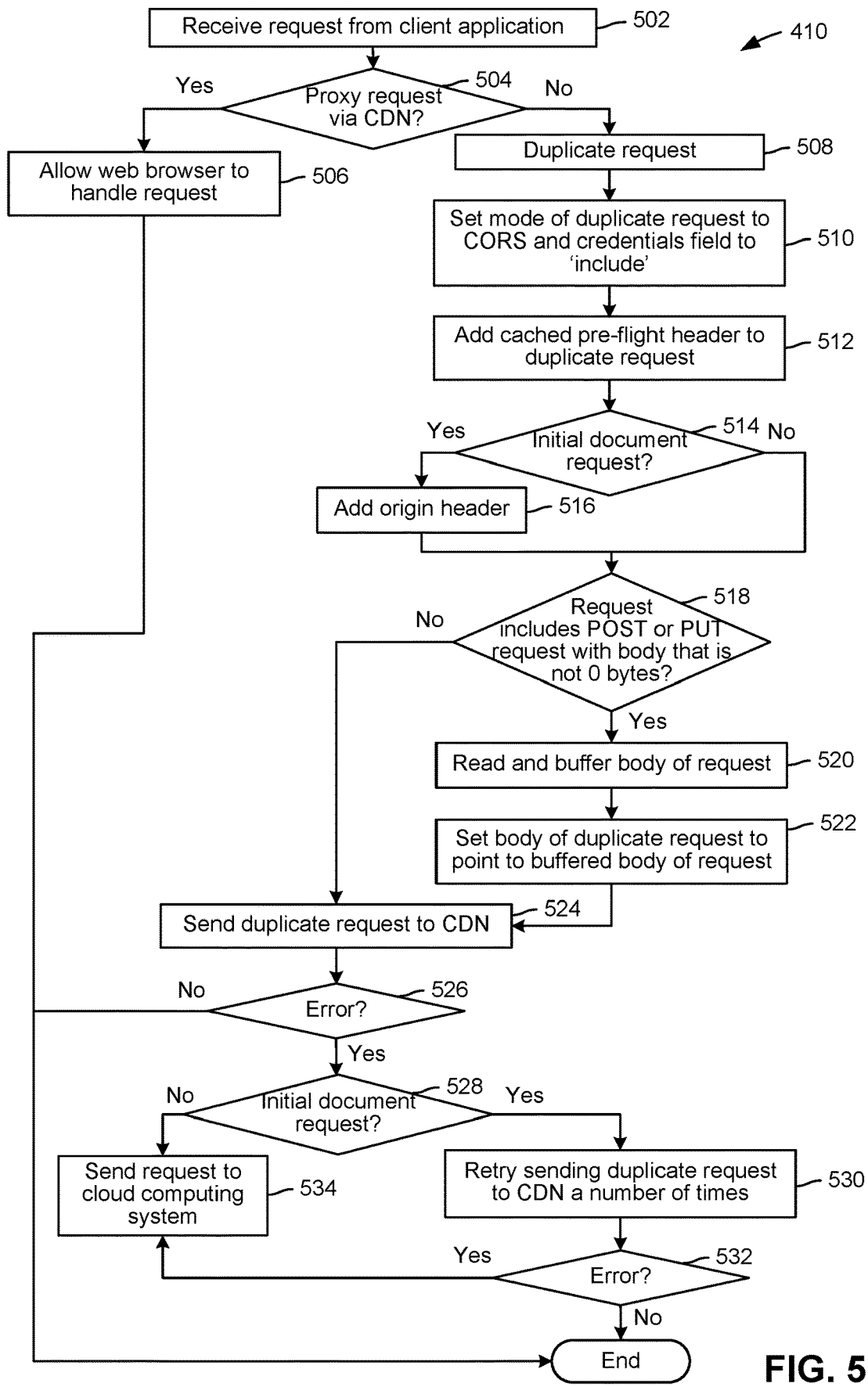
FIG. 5 is a flow diagram of method steps for proxying a network request via a content distribution network using a service worker, according to various embodiments.

FIG. 5 is a flow diagram of method steps for using a service worker to proxy a network request via a content distribution network, according to various embodiments. Although the method steps are described with reference to the systems of FIGS. 1-3, persons skilled in the art will understand that any system configured to implement the method steps, in any order, falls within the scope of the present disclosure.

As shown, at step 502, the service worker 108 receives a request from the client application 106. As described, the service worker 108 can receive fetch events from the web browser 104 in response to network requests associated with the webpage(s) controlled by the service worker 108. In particular, once installed, all network requests, including the initial document request for the markup, can be intercepted by the service worker by default.

At step 504, the service worker 108 determines whether to proxy the request via the CDN 120. The service worker 108 may proxy some or all of the received requests. In some embodiments, when the initial markup for a webpage is loaded via the service worker 108, the service worker 108 may modify the markup such that the web browser 104 adds a query parameter to subsequent API requests associated with the webpage, indicating that those API requests should be proxied via the CDN 120. In such cases, the service worker 108 will attempt to proxy requests having the added query parameter via the CDN 120. In some embodiments, the service worker 108 may be configured to proxy certain types of requests, such as document navigation requests and API requests, but not other types of requests, such as requests for streaming media content, via the CDN 120. As described, because the CDN 120 does not need to take over the domain of the website, the service worker 108 can proxy requests via the CDN 120 webpage loading using the same (non-main) domain for initial document requests as subsequent dynamic requests. As a result, duplicate TCP/TLS handshakes to two different endpoints, namely the main domain and the non-main domain, can be avoided.

At step 506, if the request is not proxied via the CDN 120, then the service worker 108 allows the request to be handled by the web browser 104. For example, the web browser 104 could transmit the request directly to the cloud computing system 130 via the Internet.

On the other hand, if the request is to be proxied via the CDN 120, then the service worker 108 duplicates the request at step 508. Then, at step 510, the service worker 108 sets a mode of the duplicate request to CORS and a credentials field to true. CORS needs to be configured to permit the hostname in the request, which is initially associated with the cloud computing system 130, to be changed to a different hostname associated with one of the server machines of the CDN 120. As described, security of the web browser 104 may prevent a non-CORS request from being sent to the different hostname. In addition, the credentials field is set to true so that cookies can be sent.

At step 512, the service worker 108 adds a cached pre-flight header to the duplicate request. Step 512 assumes that the pre-flight header has been cached in, e.g., a database of the web browser 104. As described, the pre-flight header can be cached to avoid an additional pre-flight request for permission to transmit a request intended for the cloud computing system 130 to the CDN 120. If, however, the pre-flight header has not been cached, then the service worker 108 may make a pre-flight request to the CDN 120, which returns a cached response to the pre-flight request.

At step 514, if the service worker 108 determines that the request is an initial document request, then, at step 516, the service worker 108 adds an origin request header to the duplicate request to indicate that the request is proxied via the CDN 120 and subsequent API requests should also be proxied via the CDN 120. As described, when the initial markup for a webpage is loaded via the service worker 108, the service worker 108 can also modify the markup such that the web browser 104 adds a query parameter to subsequent API requests associated with the webpage, indicating that those API requests should be proxied via the CDN 120.

At step 518, the service worker 108 determines whether the request includes a POST or PUT request with a body that is not 0 bytes. If the request includes a POST or PUT request with a body that is not 0 bytes, then at step 520, the service worker 108 reads and temporarily stores the body of the request in a buffer. As described, some requests (e.g., POST and PUT requests with bodies that are not 0 bytes) may have bodies that include stream elements that cannot be copied directly into the duplicate request, in which case the service worker 108 may read the body of those requests and buffer the bodies as blob or array buffer objects. Then, at step 522, the service worker 108 sets a body of the duplicate request, created at step 508, to point to the buffered body of the request, such as the buffered blob or array buffer object.

Subsequent to setting the body of the duplicate request to point to the buffered body of the request, or if the service worker 108 determines at step 514 that the request does not include a POST or PUT request with a body that is not 0 bytes, the service worker 108 sends the duplicate request to the CDN 120 at step 524. As described, the CDN 120 proxies the request to the cloud 130, thereby accelerating loading of a webpage in response to an initial document request or delivery of dynamic content in response to an API request.

At step 526, if the service worker 108 detects an error, such as if the path 112 via the CDN 120 cannot be reached, then at step 528, the service 108 further determines whether the request is an initial document request to load a webpage, which is handled differently than an API request after the webpage has loaded.

If the request is an initial document request, then at step 530, the service worker 108 retries sending the duplicate request to the CDN 120 a number of times. If the service worker 108 continues detecting an error at step 532, or if the service worker 108 determines at step 528 that the request is not an initial document request, then at step 534, the service worker 108 sends the request to the cloud computing system 130. In some embodiments, the service worker 108 may additionally enter a "error mode" in which the service worker 108 also sends subsequent requests to the cloud computing system 130, rather than the CDN 120.

At least one technical advantage of the disclosed techniques relative to the prior art is an initial request to load a webpage on a web browser can be accelerated via a content distribution network that is in communication with a cloud computing system. When a request to the content distribution network encounters an error, the request can be re-transmitted directly to the cloud computing system as a fallback route that improves resiliency. In addition, the content distribution network does not need to host security certificates for sensitive hostnames. These technical advantages represent one or more technological advancements over prior art approaches.

1. In some embodiments, a computer-implemented method for processing a network request comprises intercepting a first network request transmitted by a web application, generating a second network request based on the first network request, and transmitting the second network request to a content distribution network for processing.

2. The computer-implemented method of clause 1, wherein generating the second network request comprises duplicating the first network request to generate a duplicated first network request and modifying one or more elements of the duplicated first network request.

3. The computer-implemented method of clauses 1 or 2, wherein the one or more elements include at least one of a header, a mode field, or a credentials field.

4. The computer-implemented method of any of clauses 1-3, wherein modifying the one or more elements of the duplicated first network request comprises adding at least one of a cached pre-flight header or an origin header to the duplicated first network request.

5. The computer-implemented method of any of clauses 1-4, wherein the first network request comprises an application programming interface (API) call, and modifying the one or more elements comprises reading a body of the first network request, storing the body of the first network request, and setting a body of the duplicated first network request to reference the body of the first network request that is stored.

6. The computer-implemented method of any of clauses 1-5, wherein the first network request comprises one of an initial document request or an application programming interface (API) request.

7. The computer-implemented method of any of clauses 1-6, further comprising retrieving configuration data from a web browser database or a server machine that specifies one or more server machines to which the second network request is transmitted in the content distribution network.

8. The computer-implemented method of any of clauses 1-7, further comprising transmitting the first network request to a cloud computing system in response to detecting an error when transmitting the second network request to the content distribution network.

9. The computer-implemented method of any of clauses 1-8, further comprising, re-transmitting the second network request to the content distribution network in response to detecting an error when transmitting the second network request to the content distribution network.

10. The computer-implemented method of any of clauses 1-9, wherein a service worker performs the steps of intercepting, generating, and transmitting, and wherein the service worker receives fetch events from a web browser and responds back to the web browser.

11. In some embodiments, one or more computer-readable storage media include instructions that, when executed by one or more processors, cause the one or more processors to process a network request, by performing the steps of intercepting a first network request transmitted by a web application, generating a second network request based on the first network request, and transmitting the second network request to a content distribution network for processing.

12. The one or more computer-readable storage media of clause 11, wherein generating the second network request comprises duplicating the first network request to generate a duplicated first network request and modifying one or more elements of the duplicated first network request.

13. The one or more computer-readable storage media of clauses 11 or 12, wherein modifying the one or more elements of the duplicated first network request comprises adding at least one of a pre-flight header or an origin header to the duplicated first network request.

14. The one or more computer-readable storage media of any of clauses 11-13, the steps further comprising retrieving the pre-flight header from a web browser cache.

15. The one or more computer-readable storage media of any of clauses 11-14, the steps further comprising obtaining the pre-flight header by transmitting a pre-flight request to the content distribution network.

16. The one or more computer-readable storage media of any of clauses 11-15, wherein the first network request comprises an application programming interface (API) call, and modifying the one or more elements comprises reading a body of the first network request, storing the body of the first network request, and setting a body of the duplicated first network request to reference the body of the first network request that is stored.

17. The one or more computer-readable storage media of any of clauses 11-16, wherein the first network request comprises one of an initial document request or an application programming interface (API) request.

18. The one or more computer-readable storage media of any of clauses 11-17, the steps further comprising transmitting the first network request to a cloud computing system in response to detecting an error when transmitting the second network request to the content distribution network.

19. The one or more computer-readable storage media of any of clauses 11-18, wherein a process that executes independently of a web application performs the steps of intercepting, generating, and transmitting.

20. In some embodiments, a system comprises one or more memories that include instructions, and one or more processors that are coupled to the one or more memories and, when executing the instructions are configured to intercept a first network request transmitted by a web application, generate a second network request based on the first network request, and transmit the second network request to a content distribution network for processing.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing a network request, the method comprising:
   intercepting, by a service worker executed by a web browser on a client device, a first network request for an initial load of a webpage transmitted by a web application;
   generating, by the service worker, a second network request based on the first network request; and
   transmitting, by the service worker, the second network request to a content distribution network for processing.

2. The computer-implemented method of claim 1, wherein generating the second network request comprises duplicating the first network request to generate a duplicated first network request and modifying one or more elements of the duplicated first network request.

3. The computer-implemented method of claim 2, wherein the one or more elements include at least one of a header, a mode field, or a credentials field.

4. The computer-implemented method of claim 2, wherein modifying the one or more elements of the duplicated first network request comprises adding at least one of a cached pre-flight header or an origin header to the duplicated first network request.

5. The computer-implemented method of claim 2, wherein the first network request comprises an application programming interface (API) call, and modifying the one or more elements comprises:
   reading a body of the first network request;
   buffering the body of the first network request; and
   setting a body of the duplicated first network request to reference the body of the first network request that is buffered.

6. The computer-implemented method of claim 1, wherein the first network request further comprises an application programming interface (API) request.

7. The computer-implemented method of claim 1, further comprising retrieving configuration data from the web browser database or a server machine that specifies one or more server machines to which the second network request is transmitted in the content distribution network.

8. The computer-implemented method of claim 1, further comprising transmitting the first network request to a cloud computing system in response to detecting an error when transmitting the second network request to the content distribution network.

9. The computer-implemented method of claim 1, further comprising, re-transmitting the second network request to the content distribution network in response to detecting an error when transmitting the second network request to the content distribution network.

10. The computer-implemented method of claim 1, wherein the service worker receives fetch events from the web browser and responds back to the web browser.

11. One or more non-transitory computer-readable storage media including instructions that, when executed by one or more processors, cause the one or more processors to process a network request, by performing the steps of:
- intercepting, by a service worker executed by a web browser on a client device, a first network request for an initial load of a webpage transmitted by a web application;
- generating, by the service worker, a second network request based on the first network request; and
- transmitting, by the service worker, the second network request to a content distribution network for processing.

12. The one or more non-transitory computer-readable storage media of claim 11, wherein generating the second network request comprises duplicating the first network request to generate a duplicated first network request and modifying one or more elements of the duplicated first network request.

13. The one or more non-transitory computer-readable storage media of claim 12, wherein modifying the one or more elements of the duplicated first network request comprises adding at least one of a pre-flight header or an origin header to the duplicated first network request.

14. The one or more non-transitory computer-readable storage media of claim 13, the steps further comprising retrieving the pre-flight header from a web browser cache.

15. The one or more non-transitory computer-readable storage media of claim 13, the steps further comprising obtaining the pre-flight header by transmitting a pre-flight request to the content distribution network.

16. The one or more non-transitory computer-readable storage media of claim 11, wherein the first network request comprises an application programming interface (API) call, and modifying the one or more elements comprises:
- reading a body of the first network request;
- buffering the body of the first network request; and
- setting a body of the duplicated first network request to reference the body of the first network request that is buffered.

17. The one or more non-transitory computer-readable storage media of claim 11, wherein the first network request further comprises an application programming interface (API) request.

18. The one or more non-transitory computer-readable storage media of claim 11, the steps further comprising transmitting the first network request to a cloud computing system in response to detecting an error when transmitting the second network request to the content distribution network.

19. A system, comprising:
- one or more memories that include instructions; and
- one or more processors that are coupled to the one or more memories and, when executing the instructions are configured to:
  - intercept, by a service worker executed by a web browser on a client device, a first network request for an initial load of a webpage transmitted by a web application,
  - generate, by the service worker, a second network request based on the first network request, and
  - transmit, by the service worker, the second network request to a content distribution network for processing.

* * * * *